US012774674B2

(12) United States Patent
Miyao et al.

(10) Patent No.: US 12,774,674 B2
(45) Date of Patent: Oct. 27, 2026

(54) VARIABLE CAPACITY TURBOCHARGER WITH VARIABLE NOZZLE ASSEMBLY

(71) Applicant: IHI Corporation, Tokyo (JP)

(72) Inventors: Ryosuke Miyao, Tokyo (JP); Takao Asakawa, Tokyo (JP); Kengo Ikeda, Tokyo (JP)

( * ) Notice: Subject to any disclaimer, the term of this patent is extended or adjusted under 35 U.S.C. 154(b) by 0 days.

(21) Appl. No.: 19/278,790

(22) Filed: Jul. 24, 2025

(65) Prior Publication Data

US 2025/0347244 A1 Nov. 13, 2025

Related U.S. Application Data

(63) Continuation of application No. PCT/JP2023/031036, filed on Aug. 28, 2023.

(30) Foreign Application Priority Data

Jan. 27, 2023 (JP) ................................ 2023-010916

(51) Int. Cl.
*F02B 37/24* (2006.01)
*F02C 6/12* (2006.01)

(52) U.S. Cl.
CPC ................ *F02B 37/24* (2013.01); *F02C 6/12* (2013.01); *F05D 2220/40* (2013.01); *F05D 2240/128* (2013.01)

(58) Field of Classification Search
CPC .. F02B 37/24; F02B 39/00; F02C 6/12; F05D 2220/40; F05D 2240/128; Y02T 10/12; F01D 17/16; F01D 25/28
See application file for complete search history.

(56) References Cited

U.S. PATENT DOCUMENTS

2011/0014032 A1 1/2011 Boening et al.
2011/0038715 A1 2/2011 Frank et al.
(Continued)

FOREIGN PATENT DOCUMENTS

CN 213711164 7/2021
JP 2009-062840 3/2009
(Continued)

OTHER PUBLICATIONS

International Search Report dated Nov. 7, 2023 for PCT/JP2023/031032.
(Continued)

*Primary Examiner* — Hoang M Nguyen
(74) *Attorney, Agent, or Firm* — SHIPWAY IP

(57) ABSTRACT

A variable capacity turbocharger includes: a turbine impeller; a turbine housing accommodating the turbine impeller; a nozzle flow passage located around the turbine impeller; a variable nozzle assembly having a nozzle vane located in the nozzle flow passage, and a drive mechanism configured to drive the nozzle vane; a bearing of the turbine impeller; a bearing housing accommodating the bearing; a biasing part configured to bias the variable nozzle assembly in an axial direction of the turbine impeller so as to be pressed against a part of the turbine housing; and a pin that extends from the bearing housing. The variable nozzle assembly includes a pin insertion part, which allows for insertion of a distal end of the pin. The distal end of the pin is inserted into the pin insertion part to restrict a rotational position of the variable nozzle assembly.

20 Claims, 6 Drawing Sheets

(56) References Cited

U.S. PATENT DOCUMENTS

| | | | | |
|---|---|---|---|---|
| 2012/0237343 | A1* | 9/2012 | Matsuyama | F02C 7/28 415/182.1 |
| 2014/0241858 | A1 | 8/2014 | Tashiro et al. | |
| 2016/0258316 | A1 | 9/2016 | Ueda et al. | |
| 2018/0363493 | A1 | 12/2018 | Asakawa et al. | |
| 2019/0153943 | A1* | 5/2019 | Asakawa | F01D 17/165 |
| 2021/0231028 | A1* | 7/2021 | Segawa | F02B 37/24 |
| 2021/0381471 | A1* | 12/2021 | Uesugi | F04D 17/025 |
| 2022/0325631 | A1 | 10/2022 | Ramb et al. | |
| 2023/0077677 | A1 | 3/2023 | Hayashi et al. | |
| 2023/0113937 | A1 | 4/2023 | Hayashi | |
| 2025/0347228 | A1* | 11/2025 | Nakagawa | F02B 37/24 |

FOREIGN PATENT DOCUMENTS

| | | |
|---|---|---|
| JP | 2011-515608 | 5/2011 |
| JP | 2012-132412 | 7/2012 |
| JP | 2013-068153 | 4/2013 |
| JP | 2015-140739 | 8/2015 |
| JP | 2022-161035 | 10/2022 |
| WO | 2009/115437 | 9/2009 |
| WO | 2017/150450 | 9/2017 |
| WO | 2021/246294 | 12/2021 |
| WO | 2021/256203 | 12/2021 |

OTHER PUBLICATIONS

International Search Report dated Nov. 7, 2023 for PCT/JP2023/031036.

International Preliminary Report on Patentability with Written Opinion dated Aug. 7, 2025 for PCT/JP2023/031032.

International Preliminary Report on Patentability with Written Opinion dated Aug. 7, 2025 for PCT/JP2023/031036.

Soei Patent and Law Firm, Statement of Related Matters, dated Aug. 28, 2025.

* cited by examiner

VARIABLE CAPACITY TURBOCHARGER WITH VARIABLE NOZZLE ASSEMBLY

CROSS-REFERENCE TO RELATED APPLICATIONS

This application is a continuation application of PCT Application No. PCT/JP2023/031036, filed on Aug. 28, 2023, which claims the benefit of priority from Japanese Patent Application No. 2023-010916, filed on Jan. 27, 2023. The entire contents of the above listed PCT and priority applications are incorporated herein by reference.

BACKGROUND

Field

The present disclosure relates to a variable capacity turbocharger.

Description of the Related Art

Japanese Unexamined Patent Application Publication No. 2013-68153 discloses a Variable capacity turbocharger. The turbocharger has a variable nozzle unit for controlling aperture of a nozzle flow passage of a turbine. Between the variable nozzle unit and a bearing housing, a disc spring is provided. The variable nozzle unit is biased by the disc spring and pressed against the turbine housing, so as to be positioned in the axial direction. International Publication No. 2021/246294 disclose a Variable capacity turbocharger. In the turbocharger, a restriction pin fixed to the bearing housing is inserted into a guide notch formed in the variable nozzle unit, thus positioning the variable nozzle unit in a plane orthogonal to the axial direction.

SUMMARY

The disc spring load will, however, decrease during operation of the turbocharger, as the disc spring deforms under heating or reduces the Young's modulus. This would reduce frictional force between the variable nozzle unit and the turbine housing, and would cause circumferential shift of the variable nozzle unit just as much as a clearance between the restriction pin and the guide notch. The circumferential shift of the variable nozzle unit will result in change in the gas flow rate.

Disclosed herein is an example variable capacity turbocharger includes: a turbine housing that accommodates a turbine impeller; a variable nozzle unit having a nozzle vane arranged in a nozzle flow passage provided around the turbine impeller in the turbine housing, and a drive mechanism configured to drive the nozzle vane; a biasing part configured to bias the variable nozzle unit in a direction of a rotation axis of the turbine impeller so as to be pressed against a part of the turbine housing; a pin that extends from a bearing housing that accommodates a bearing of the turbine impeller; and a pin insertion part provided to the variable nozzle unit, and allowed for insertion of a distal end of the pin. The pin insertion part having a pair of inner wall faces given as parallel flat planes that intersect the circumferential direction of rotation of the turbine impeller, and holding the distal end of the pin in between in the circumferential direction of rotation. The distal end of the pin is press-fitted between the inner wall faces.

DETAILED DESCRIPTION

Disclosed herein is an example variable capacity turbocharger includes: a turbine housing that accommodates a turbine impeller; a variable nozzle unit having a nozzle vane arranged in a nozzle flow passage provided around the turbine impeller in the turbine housing, and a drive mechanism configured to drive the nozzle vane; a biasing part configured to bias the variable nozzle unit in a direction of a rotation axis of the turbine impeller so as to be pressed against a part of the turbine housing; a pin that extends from a bearing housing that accommodates a bearing of the turbine impeller; and a pin insertion part provided to the variable nozzle unit, and allowed for insertion of a distal end of the pin. The pin insertion part has a pair of inner wall faces given as parallel flat planes that intersect the circumferential direction of rotation of the turbine impeller, and holding the distal end of the pin in between in the circumferential direction of rotation. The distal end of the pin is press-fitted between the inner wall faces.

In the variable capacity turbocharger, the pin insertion part may be a notch or an oblong hole that extends in a direction intersecting the circumferential direction of rotation.

In the variable capacity turbocharger, the pin may be a member whose dimension, in the direction the inner wall faces are opposed, is elastically variable.

In the variable capacity turbocharger, the pin may be a coiled pin whose outer diameter is elastically variable.

In the following description, with reference to the drawings, the same reference numbers are assigned to the same components or to similar components having the same function, and overlapping description is omitted.

Figure 1:
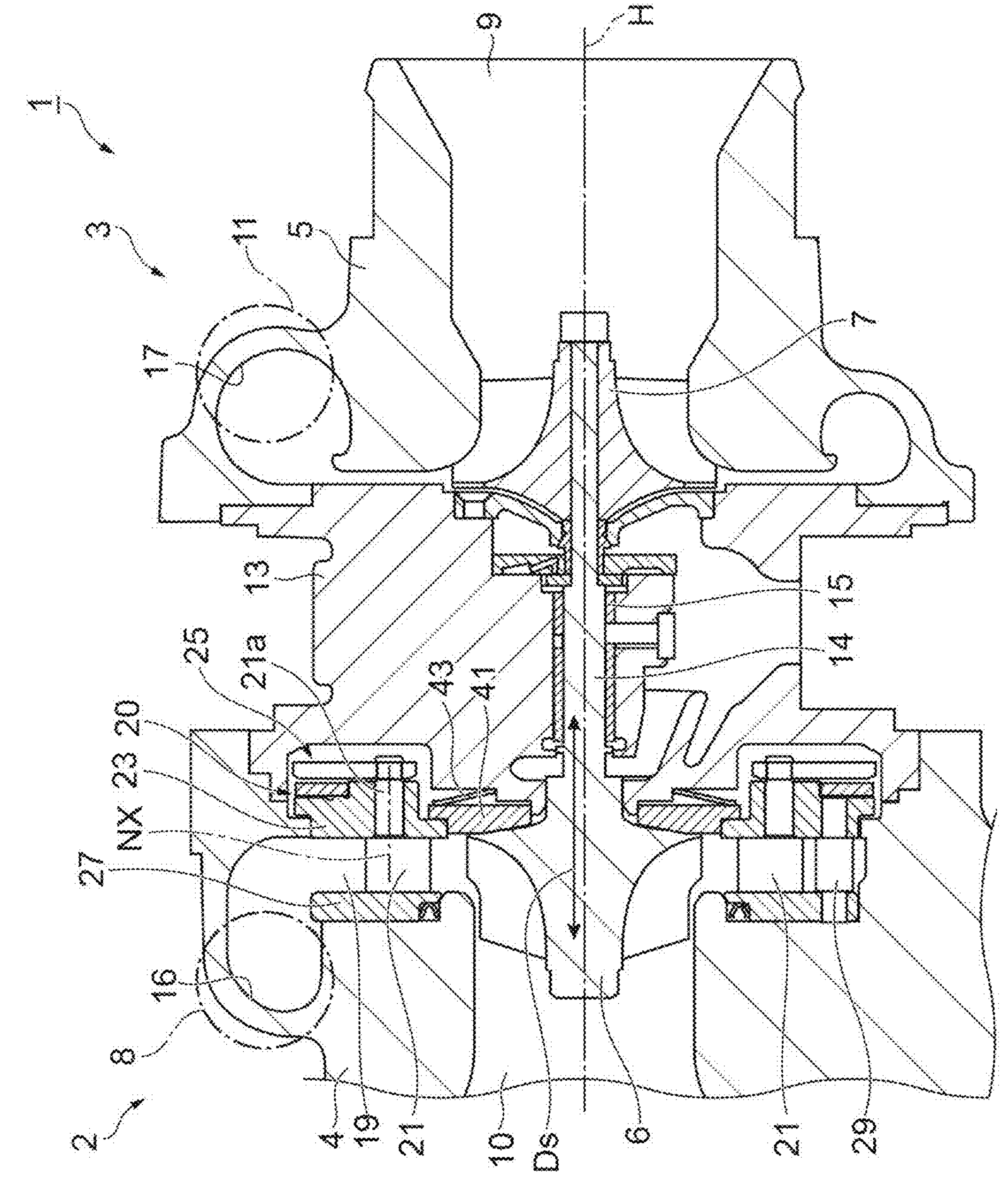
FIG. 1 is a cross-sectional view illustrating an example variable capacity turbocharger.

FIG. 1 is a cross-sectional view illustrating a cross section taken along a rotation axis H of an example variable capacity turbocharger 1. The variable capacity turbocharger 1 is applicable to an internal combustion engine of ships or vehicles.

As illustrated in FIG. 1, the turbocharger 1 has a turbine 2 and a compressor 3. The turbine 2 has a turbine housing 4, and a turbine impeller 6 accommodated in the turbine housing 4. The turbine housing 4 has a scroll flow passage 16 that extends in the circumferential direction De around the turbine impeller 6. The compressor 3 has a compressor housing 5, and a compressor impeller 7 accommodated in the compressor housing 5. The compressor housing 5 has a scroll flow passage 17 that extends in the circumferential direction De around the compressor impeller 7.

The turbine impeller 6 is provided to one end of a rotating shaft 14, and the compressor impeller 7 is provided to the other end of the rotating shaft 14. Between the turbine housing 4 and the compressor housing 5, there is provided a bearing housing 13. The rotating shaft 14 is rotatably supported by the bearing housing 13, intermediated by a bearing 15, whereby the rotating shaft 14, the turbine impeller 6, and the compressor impeller 7 rotate, as an integrated rotating body, around the rotation axis H.

The turbine housing 4 is provided with an exhaust gas inlet 8 and an exhaust gas outlet 10. Exhaust gas discharged from an internal combustion engine flows through the exhaust gas inlet 8 into the turbine housing 4, and flows through the scroll flow passage 16 into the turbine impeller 6, thereby rotating the turbine impeller 6. The exhaust gas thereafter flows through the exhaust gas outlet 10 out of the turbine housing 4.

The compressor housing 5 is provided with an intake port 9 and a discharge port 11. As the turbine impeller 6 rotates as described above, the compressor impeller 7 rotates in conjunction with the rotating shaft 14. The rotating compressor impeller 7 sucks the external air through the intake port 9. The air passes through the compressor impeller 7 and the scroll flow passage 17 to be compressed, and is discharged through the discharge port 11. The compressed air discharged from the discharge port 11 is supplied to the aforementioned internal combustion engine.

The turbine 2 of the turbocharger 1 will further be described. Note that the following description simply stating "axial direction", "radial direction" and "circumferential direction" shall mean the direction Ds of rotation axis (direction of rotation axis H), the radial direction Dr of rotation, and the circumferential direction Dc of rotation of the turbine impeller 6, respectively. Also note that the description stating "upstream" and "downstream" shall mean the upstream and the downstream of the exhaust gas in the turbine 2. Also note that, in the direction Ds of the rotation axis H, a side close to the turbine 2 of the turbocharger 1 (left side in FIG. 1) may be simply referred to as "turbine side", and a side close to the compressor 3 (right side in FIG. 1) as "compressor side" on occasions.

The turbine 2 of the turbocharger 1 has a nozzle flow passage 19 which is provided around the turbine impeller 6, and is structured to connect the scroll flow passage 16 and the turbine impeller 6. The nozzle flow passage 19 has a plurality of movable nozzle vanes 21. The nozzle vanes 21 are arranged almost at equal intervals on a circumference centered round the rotation axis H. The individual nozzle vanes 21 synchronously pivot about an axis NX parallel to the rotation axis H. As a result of such pivoting of the nozzle vanes 21, each gap between the adjacent nozzle vanes 21 widens and narrows, thus controlling aperture of the nozzle flow passage 19.

The turbine 2 has a variable nozzle unit 20 for thus driving the nozzle vanes 21. The variable nozzle unit 20 is fitted inside the turbine housing 4. The variable nozzle unit 20 has the nozzle vanes 21, and two nozzle rings 23, 27 that hold in between the nozzle vanes 21 in the axial direction Ds. The two nozzle rings 23, 27 are arranged in the axial direction Ds, wherein the nozzle ring 23 is arranged closer to the compressor, as compared with the nozzle ring 27. Each of the nozzle rings 23, 27 has a ring shape centered round the rotation axis H, and is arranged so as to surround the turbine impeller 6 in the circumferential direction Dc. A region demarcated between the two nozzle rings 23, 27 in the axial direction Ds forms the nozzle flow passage 19. The nozzle rings 23, 27 are coupled with use of a plurality of coupling pins 29 in the axial direction Ds. With the coupling pins 29 manufactured with high dimensional accuracy, the nozzle flow passage 19 will have high dimensional accuracy in the axial direction Ds.

The variable nozzle unit 20 further has a drive mechanism 25 for driving the nozzle vanes 21. The drive mechanism 25 is accommodated in a space between the nozzle ring 23 and the bearing housing 13, and is structured to transmit a drive force from an external actuator to the nozzle vanes 21.

Figure 2:
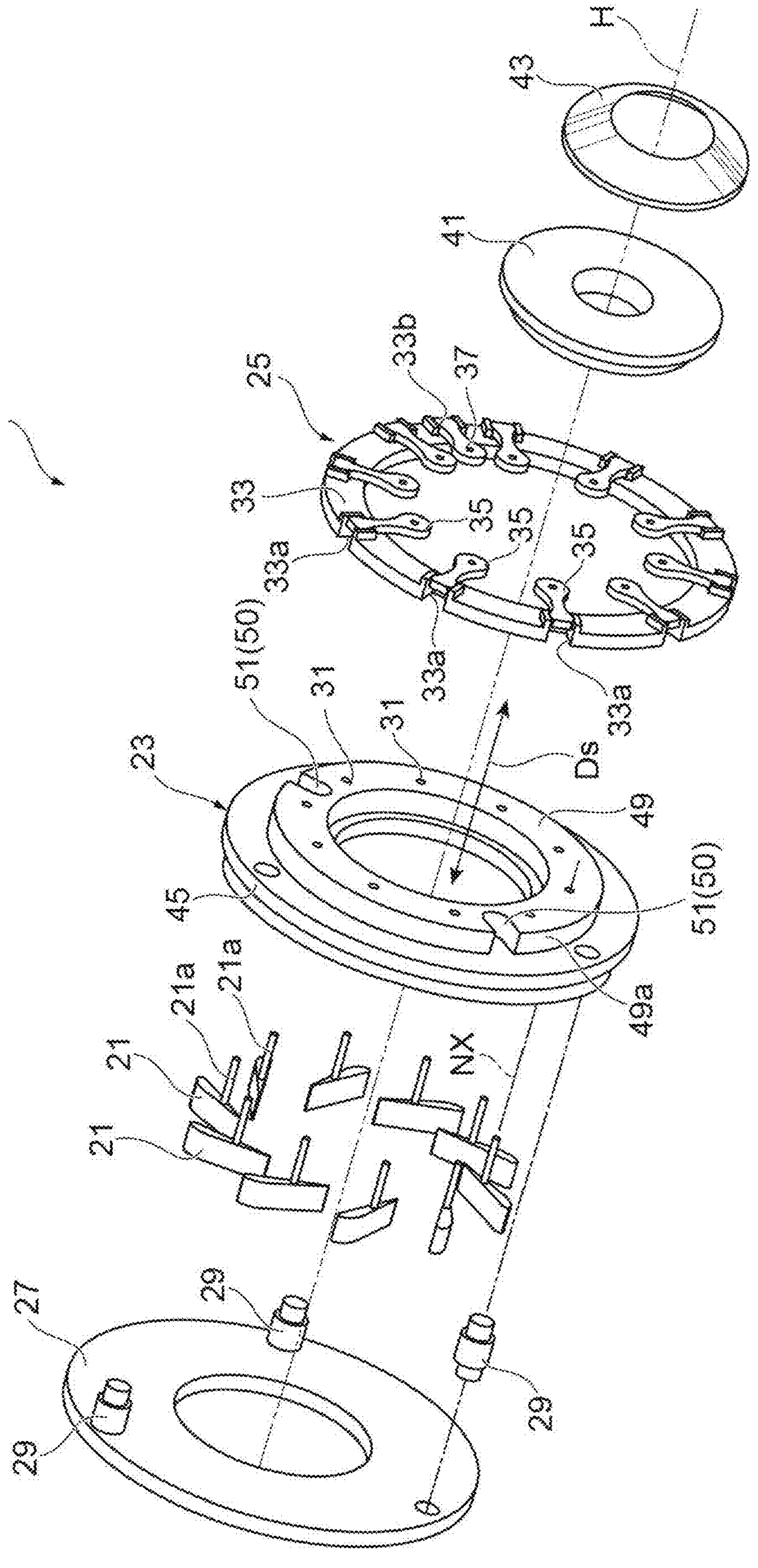
FIG. 2 is an exploded perspective view illustrating an example variable nozzle unit and so forth.
Figure 3:
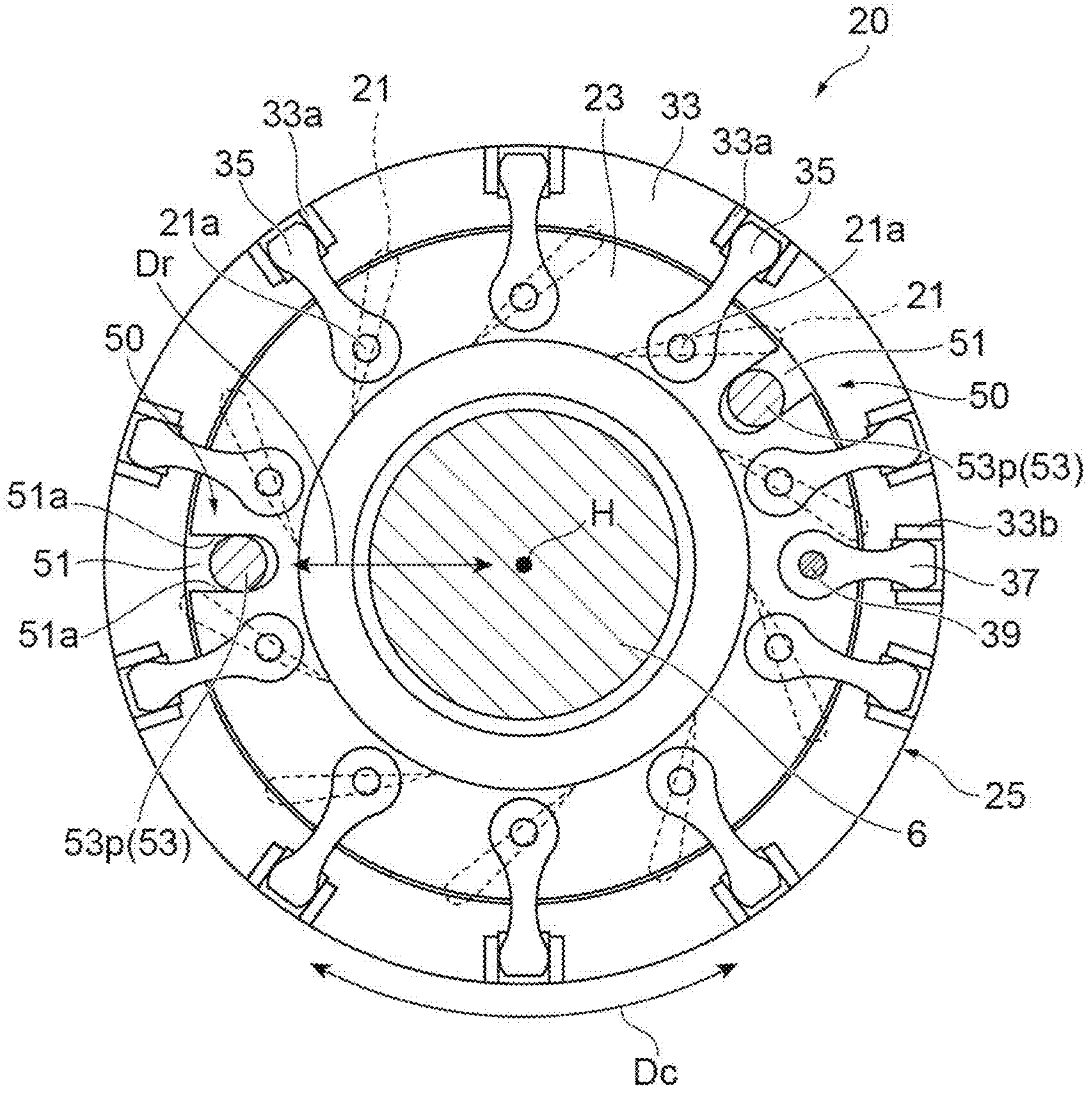
FIG. 3 is a plan view illustrating the variable nozzle unit as viewed in the axial direction from a bearing housing side.

The drive mechanism 25 of the variable nozzle unit 20 will be further detailed, with reference to FIGS. 2 and 3. FIG. 2 is an exploded perspective view illustrating the variable nozzle unit 20, and a heat shielding plate 41 and a disc spring 43 described later. FIG. 3 is a plan view illustrating the variable nozzle unit 20 as viewed in the axial direction Ds from the side of the bearing housing 13. The nozzle ring 23 has bearing holes 31 provided so as to penetrate therethrough in the axial direction Ds. Each bearing hole 31 has inserted therein a pivot shaft 21*a* of each nozzle vane 21 in a pivotable manner. The nozzle vanes 21 illustrated in FIG. 3, are arranged at regular interval around the circumference. The nozzle vanes 21 may also be arranged at irregular intervals around the circumference.

The drive mechanism 25 has a drive ring 33, nozzle link plates 35, and a drive link plate 37. The drive ring 33 has a ring shape that extends along a circumference centered around the rotation axis H, and is arranged along a face, on the compressor side, of the nozzle ring 23. The drive ring 33 is pivotable about the rotation axis H, relative to the nozzle ring 23. On the drive ring 33, there are engagement parts 33*a* that engage with the individual nozzle link plates 35, provided at predetermined intervals in the circumferential direction Dc.

There are the same number of nozzle link plates 35 and the nozzle vanes 21. Each nozzle link plate 35 is attached to an end of the pivot shaft 21*a* of each nozzle vane 21, and extends outwards from the end in the radial direction Dr. Each pivot shaft 21*a* of the nozzle vane 21 is inserted into the bearing hole 31, and an end of each pivot shaft 21*a* protrudes from the nozzle ring 23 towards the compressor side. The inner circumferential end of each nozzle link plate 35 is attached to each end of the protruding pivot shaft 21*a*. The outer circumferential end of each nozzle link plate 35 meshes with each engagement part 33*a* of the drive ring 33.

The drive ring 33 is also provided with one input-side engagement part 33*b*. The input-side engagement part 33*b* is located between a pair of the engagement parts 33*a*. The outer circumferential end of the drive link plate 37 meshes with the input-side engagement part 33*b*. The inner circumferential end of the drive link plate 37 is connected to a drive shaft 39 (FIG. 3) of an external actuator.

When the external actuator pivots, through the drive shaft 39, the drive link plate 37 about an axis parallel to the rotation axis H, the outer circumferential end of the drive link plate 37 pushes the input-side engagement part 33*b* in the circumferential direction Dc. This pivots the drive ring 33 about the rotation axis H, and the individual engagement parts 33*a* of the drive ring 33 push the outer circumferential ends of the individual nozzle link plates 35 in the circumferential direction Dc. The individual nozzle link plates 35 then pivot about the axis NX, thus causing pivoting of the individual nozzle vanes 21 fixed to the individual nozzle link plates 35 about the axis NX.

Next, a structure for positioning the aforementioned variable nozzle unit 20 in the turbine housing 4 will be described. As illustrated in FIGS. 1 and 2, a heat shielding plate 41 is provided between the turbine impeller 6 and the bearing housing 13. The heat shielding plate 41 shields radiant heat from the high-temperature turbine housing 4, thereby suppressing temperature rise of the bearing housing 13. The heat shielding plate 41 has an annular shape that surrounds the rotating shaft 14 in the circumferential direction Dc. The heat shielding plate 41 is fitted into the center opening of the nozzle ring 23, from the side of the bearing housing 13.

Between the heat shielding plate 41 and the bearing housing 13, the disc spring 43 is held. The rotating shaft 14 is inserted into a hole at the center of the disc spring 43, whereby the disc spring 43 is arranged along a conical face centered round the rotation axis H which gives the cone axis. One end of disc spring 43 in the axial direction Ds is in contact with the bearing housing 13. The other end is in contact with the heat shielding plate 41. The disc spring 43 generates a repulsive force that acts to stretch the distance between the bearing housing 13 and the heat shielding plate 41 in the axial direction Ds. With the disc spring 43, the variable nozzle unit 20 and the heat shielding plate 41 are biased towards the turbine housing 4, in the axial direction Ds.

Figure 4:
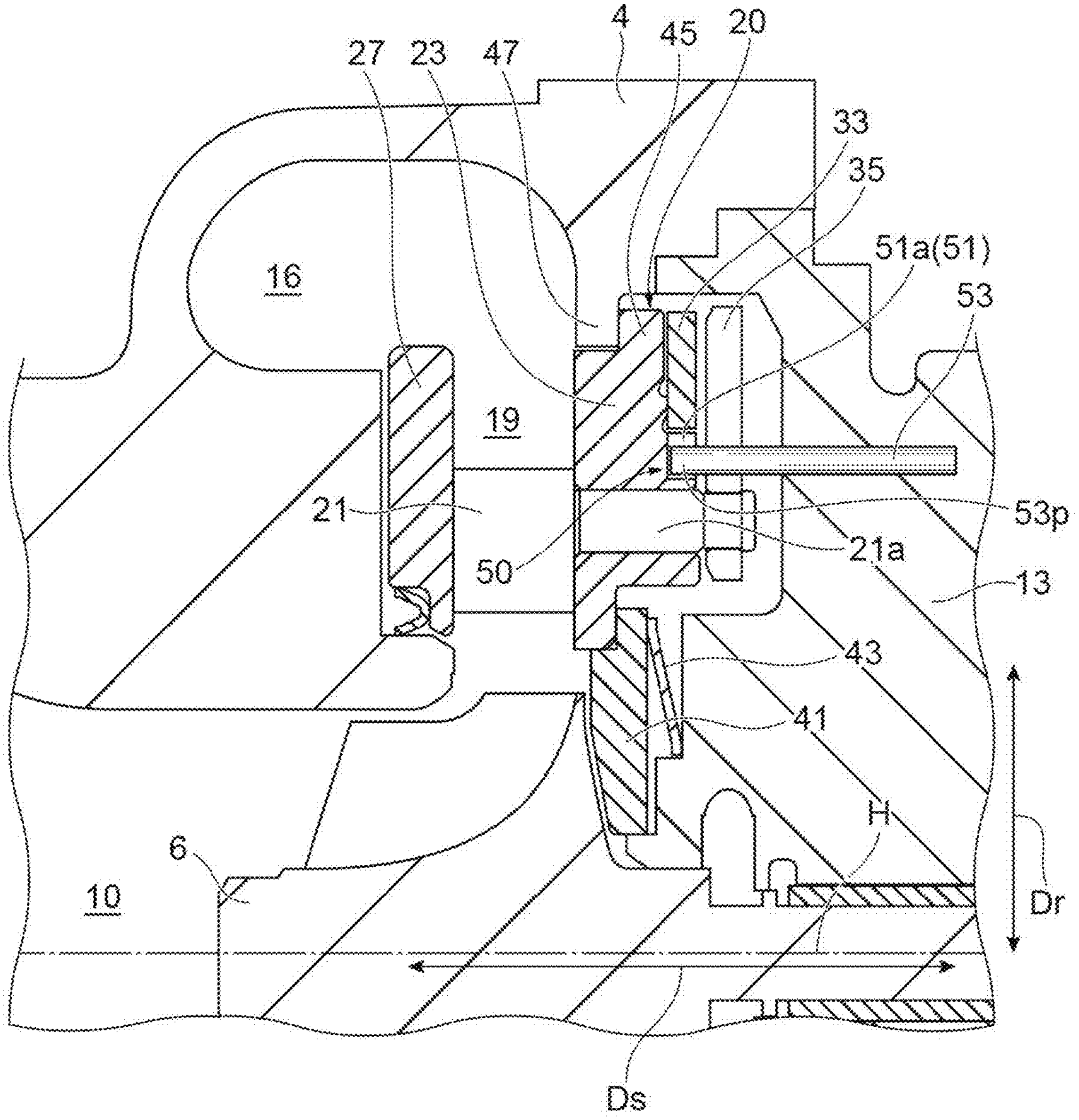
FIG. 4 is an enlarged cross-sectional view illustrating an area at and around the variable nozzle unit of the variable capacity turbocharger.

FIG. 4 is an enlarged cross-sectional view illustrating an area at and around the variable nozzle unit 20 illustrated in FIG. 1. The nozzle ring 23 has a flange 45 formed so as to protrude towards the outer circumferential side. On the other hand, the turbine housing 4 has formed therein a ridge 47 structured to catch the flange 45. The ridge 47 protrudes from the inner wall face of the turbine housing 4 towards the inner circumferential side, and extends in a ring shape along the circumference centered round the rotation axis H. The inner diameter of the ridge 47 is formed smaller than the outer diameter of the flange 45, and the flange 45 abuts against the ridge 47 from the bearing housing 13 side.

With such structure, the variable nozzle unit 20 is biased by the disc spring 43, towards the turbine side. With such biasing force, the flange 45 of the nozzle ring 23 is pressed against the ridge 47. With the flange 45 thus pressed against the ridge 47, the variable nozzle unit 20 is positioned in the axial direction Ds, and thus fixed. The variable nozzle unit 20 is fixed with a certain level of fixing force, also in an in-plane direction orthogonal to the axial direction Ds, with the aid of the frictional force that acts between the flange 45 and the ridge 47. Note however if difference of thermal expansion should occur between the variable nozzle unit 20 and the turbine housing 4, such difference of thermal expansion can be absorbed, as a result of sliding between the flange 45 and the ridge 47.

Next, how to position the variable nozzle unit 20 in the circumferential direction Dc and radial direction Dr will be described. As has been described previously, the variable nozzle unit 20 is fixed with a certain level of fixing force, also in an in-plane direction orthogonal to the axial direction Ds, with the aid of the frictional force that acts between the flange 45 and the ridge 47 (flange catcher). In an example, this type of variable nozzle unit could have employed the aforementioned structure described in Patent Literature "International Publication No. 2021/246294", as a structure for restricting the circumferential shift of the variable nozzle unit. The structure described in the Patent Literature is provided with a restriction pin that extends from the bearing housing towards the turbine side. A nozzle ring of the variable nozzle unit is provided with a guide notch that extends nearly in the radial direction. With the restriction pin inserted into the guide notch, the variable nozzle unit is positioned in the in-plane direction orthogonal to the axial direction.

Assuming now a case where the structure of the Patent Literature as described above is adopted to the turbocharger. During operation of the turbocharger, the disc spring load applied by the disc spring (biasing part) will decrease, as the disc spring deforms under heating or reduces the Young's modulus. This would reduce frictional force between the flange and the ridge, and would cause circumferential shift (pivotal shift about the rotation axis) of the variable nozzle unit, just as much as the clearance between the restriction pin and the guide notch in the structure described in the Patent Literature. The circumferential shift of the variable nozzle unit will result in change in the flow rate of exhaust gas, particularly when the nozzle flow passage is closed. Now, the turbocharger 1 illustrated in FIGS. 2 to 4, has a structure explained below, allowed for suppression of the circumferential shift of the variable nozzle unit 20 during operation. The turbocharger 1 allows for the restriction of the rotational position of the variable nozzle unit 20 during operation.

As illustrated in FIGS. 2 to 4, the nozzle ring 23 has, formed at the center of a face thereof on the compressor side, a ring-shaped protrusion 49 that protrudes so as to form a step from the circumference towards the compressor side. The drive ring 33 is arranged so as to concentrically surround the ring-shaped protrusion 49. An outer circumferential end face 49*a* of the ring-shaped protrusion 49 that corresponds to the step forms a cylindrical face whose diameter is slightly smaller than the inner diameter of the drive ring 33, and guides the rotation of the drive ring 33.

A pin insertion part (e.g., pin receptor) is formed in the ring-shaped protrusion 49. The pin insertion part (e.g., U-notch 51) allows for the insertion of a distal end 53*p* of the pin 53 formed in the bearing housing 13. The U-notch 51 extends in a transverse direction (e.g., the radial direction Dr of the turbine impeller 6) intersecting the circumferential direction Dc of rotation. The U-notch 51 is formed by notching the ring-shaped protrusion 49 over the entire thickness thereof, so as to extend in the radial direction Dr from the outer circumferential end face 49*a* towards the inner circumferential side. The U-notch 51 has a pair of inner wall faces 51*a*, 51*a* opposed in the circumferential direction Dc. The inner wall faces 51*a*, 51*a* form flat planes parallel to each other. The inner wall faces 51*a* intersect the circumferential direction Dc of the turbine impeller 6.

Figure 5A:
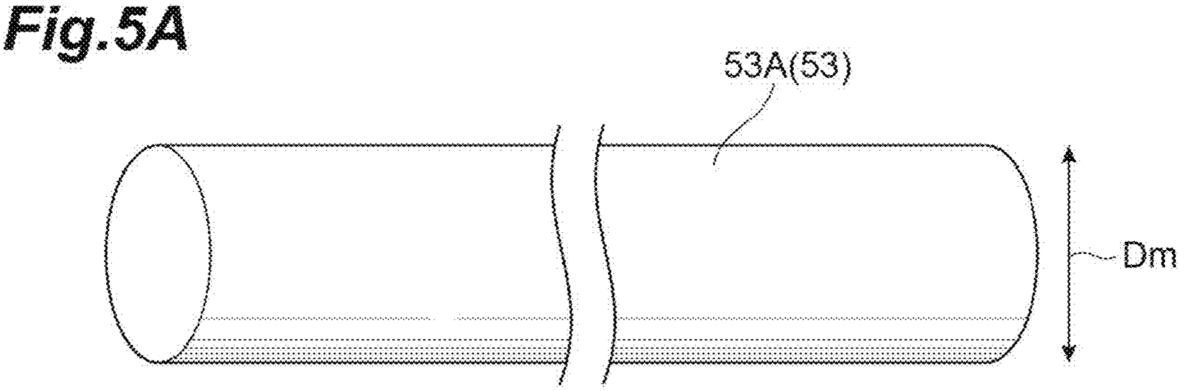
FIG. 5A is a perspective view illustrating an example pin.
Figure 5B:
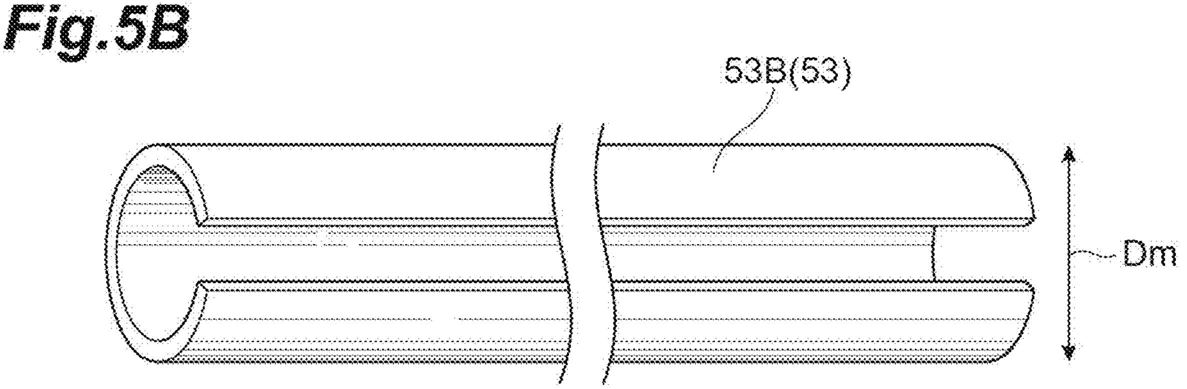
FIG. 5B is a perspective view illustrating an example pin.
Figure 5C:
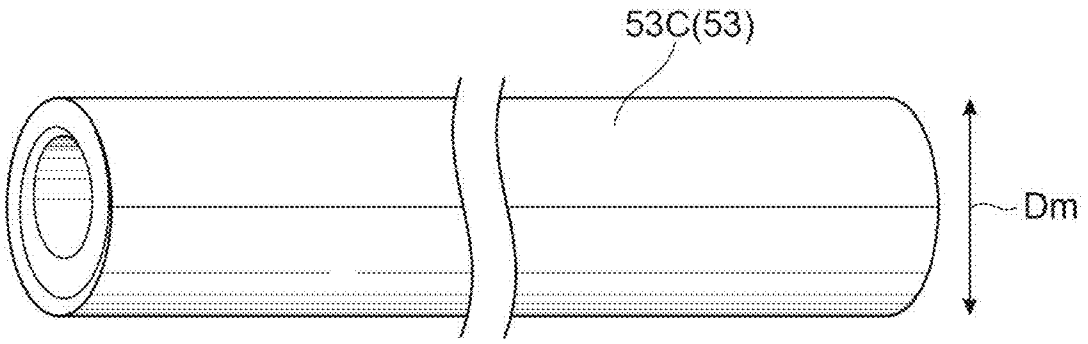
FIG. 5C is a perspective view illustrating an example pin.

From a face, on the turbine side, of the bearing housing 13, a pin 53 extends towards the turbine side in the axial direction Ds. The pin 53 and the U-notch 51 are arranged at the same circumferential position. The pin 53 is a round rod-like member, whose diameter is nearly equal to a gap between the inner wall faces 51*a* (width of the U-notch 51). Alternatively, the diameter of the pin 53 is slightly larger than the gap between the inner wall faces 51*a*. The pin 53 may be a solid pin 53A having a solid circular cross section as illustrated in FIG. 5A. The pin 53 may alternatively be a spring pin 53B having a C-shaped cross section lacking a part of the ring as illustrated in FIG. 5B. The pin 53 may alternatively be a coiled pin 53C formed of a member coiled in multiple turns as illustrated in FIG. 5C.

A base end of the pin 53 is press-fitted into the bearing housing 13. A distal end 53*p* of the pin 53 is inserted into the U-notch 51, and held between the inner wall faces 51*a* in the circumferential direction Dc. With this structure, the variable nozzle unit 20 is positioned in the circumferential direction Dc with respect to the bearing housing 13, with the aid of the pin 53. There is a clearance in the radial direction Dr, between the pin 53 and the bottom of the U-notch 51. Contact points of the pin 53 with the inner wall faces 51*a*, 51*a* reside at middle parts, in the radial direction Dr, of the inner wall faces 51*a*, 51*a*. That is, the inner wall faces 51*a*, 51*a*, which are parallel to each other, extend from a position on the inner circumferential side relative to the contact points with the pin 53 to a position on the outer circumferential side (outer circumferential end face 49*a*).

The distal end 53*p* of the pin 53 is press-fitted into the U-notch 51. That is, the pin 53 is tightly fitted without clearance between the inner wall faces 51*a* in the circumferential direction Dc, and is therefore fixed to the U-notch 51 under the surface pressure applied in the circumferential direction Dc from the inner wall faces 51*a*, 51*a*. Since there is a gap between the pin 53 and the bottom of the U-notch 51 in the radial direction Dr as described previously, the pin 53 can shift in the radial direction Dr in the U-notch 51, against the frictional force from the inner wall faces 51*a*, 51*a* ascribed to the surface pressure.

As illustrated in FIGS. 2 and 3, the turbocharger 1 has two pairs of the pin 53 and the U-notch 51. The turbocharger 1 has the engagement parts 50, where the pin 53 and the U-notch 51 are engaged, at two places as described previously. The turbocharger 1 may have a single engagement part 50, or multiple engagement parts 50.

Paragraphs below will describe operations of the turbocharger 1 equipped with the aforementioned U-notch 51 and the pin 53. In the turbocharger 1 illustrated in FIG. 3, the circumferential shift of the variable nozzle unit 20 (the rotational position of the variable nozzle assembly 20) is restricted, by insertion of the pin 53 that extends from the bearing housing 13 into the U-notch 51 of the variable nozzle unit 20. The distal end 53*p* of the pin 53 is press-fitted into the U-notch 51 as described previously, whereby the pin 53 is fixed under the surface pressure applied in the circumferential direction Dc from the inner wall faces 51*a*, 51*a*. Therefore, there is no circumferential clearance between the pin 53 and the U-notch 51, so that the variable nozzle unit 20 may not cause the circumferential shift ascribed to the clearance. Hence, the variable nozzle unit 20 during operation is suppressed from shifting in the circumferential direction Dc, so that the turbocharger 1 may suppress change in the flow rate of exhaust gas in the nozzle flow passage 19.

Assuming a case where a circle hole into which the pin 53 is press-fitted were provided in place of the U-notch 51, the variable nozzle unit 20 would be restricted also in the radial direction Dr by the pin 53. Accordingly, difference in thermal expansion between the variable nozzle unit 20 and the bearing housing 13, if occurred, would cause thermal deformation of the variable nozzle unit 20 centered round the engagement part 50. In contrast, in the U-notch 51 illustrated in FIG. 3 or 4, the pin 53 becomes able to move in the U-notch 51 in the radial direction Dr, against the frictional force with the inner wall faces 51*a*, 51*a*. The aforementioned difference in thermal expansion is therefore absorbed, and this successfully suppresses change in the flow rate of exhaust gas in the nozzle flow passage 19 during operation.

Moreover, when a solid pin 53A (FIG. 5A) is used as the pin 53, it may have higher strength of the pin 53 compared to a spring pin 53B (FIG. 5B) or a coil pin 53C (FIG. 5C).

Now, a press-fitting load of the pin 53 into the U-notch 51 will be considered. The press-fitting load, if large, means that the frictional force between the pin 53 and the inner wall faces 51*a*, 51*a* is large, and this tends to promote wear of the pin 53 or the inner wall faces 51*a*, 51*a*, when the pin 53 moves in the U-notch 51 against the frictional force. Wear of the pin 53 or the inner wall faces 51*a*, 51*a* may produce a circumferential gap between the pin 53 and the inner wall faces 51*a*, 51*a*.

The spring pin 53B illustrated in FIG. 5A or the coiled pin 53C illustrated in FIG. 5B is given as a member whose dimension (e.g., width) Dm in the direction the inner wall faces 51*a*, 51*a* are opposed (circumferential direction Dc) is elastically variable. The coiled pin 53C is a member whose outer diameter is elastically variable. Hence, the spring pin 53B or the coiled pin 53C may require the press-fitting load for press-fitting into the U-notch 51, relatively smaller than that required by the solid pin 53A. Hence, the frictional force between the pin 53B or 53C and the inner wall faces 51*a* relatively smaller than the frictional force between the pin 53A and the inner wall faces 51*a*. Accordingly, the pin 53B or 53C may suppress the aforementioned wear of the pin 53B, 53C or the inner wall faces 51*a* compare to the pin 53A. Moreover, even if the pin 53B, 53C or the inner wall faces 51*a* should wear, the pin 53B, 53C will elastically expand the diameter to reduce the circumferential gap just ascribed to the wear, thereby suppressing the circumferential clearance.

The press-fitting load of the pin 53 into the U-notch 51, if large, will increase the frictional force between the pin 53 and the inner wall faces 51*a*, 51*a* in the axial direction Ds. The frictional force in the axial direction Ds will act to inhibit the biasing force of disc spring 43 that biases the variable nozzle unit 20 in the axial direction Ds, and to weaken the force by which the flange 45 is pressed against the ridge 47, thus reducing the frictional force between the flange 45 and the ridge 47. In order to constantly keeping the biasing force larger than the frictional force in the axial direction Ds between the pin 53 and the inner wall faces 51*a*, 51*a*, the disc spring 43 may be designed to have a large load and a strict tolerance.

The spring pin 53B or the coiled pin 53C may cause the frictional force with the inner wall faces 51*a* in the axial direction Ds, which is relatively smaller than that caused by the solid pin 53A. This successfully suppress the aforementioned inhibition of the biasing force of the disc spring 43 in the axial direction Ds. This moderates the aforementioned load or tolerance of the disc spring 43, and improves the design feasibility. In these respects, the spring pin 53B or the coiled pin 53C may be used as the spring pin 53.

Employment of the spring pin 53B or the coiled pin 53C requires relatively small press-fitting load of the pin 53B, 53C into the U-notch 51, thus improving assemblability of the engagement part 50. Note that the pin 53, if given as the spring pin 53B, will have the strength and the like that depend on the orientation of the pin 53, and may need the orientation thereof to be adjusted during assemblage, whereas if given as the coiled pin 53C having high isotropy of the strength and the like, and less needing adjustment of the orientation of the pin 53 during assemblage, will enjoy improved assemblability.

It is to be understood that not all aspects, advantages and features described herein may necessarily be achieved by, or included in, any one particular example. Indeed, having described and illustrated various examples herein, it should be apparent that other examples may be modified in arrangement and detail.

Figure 6A:
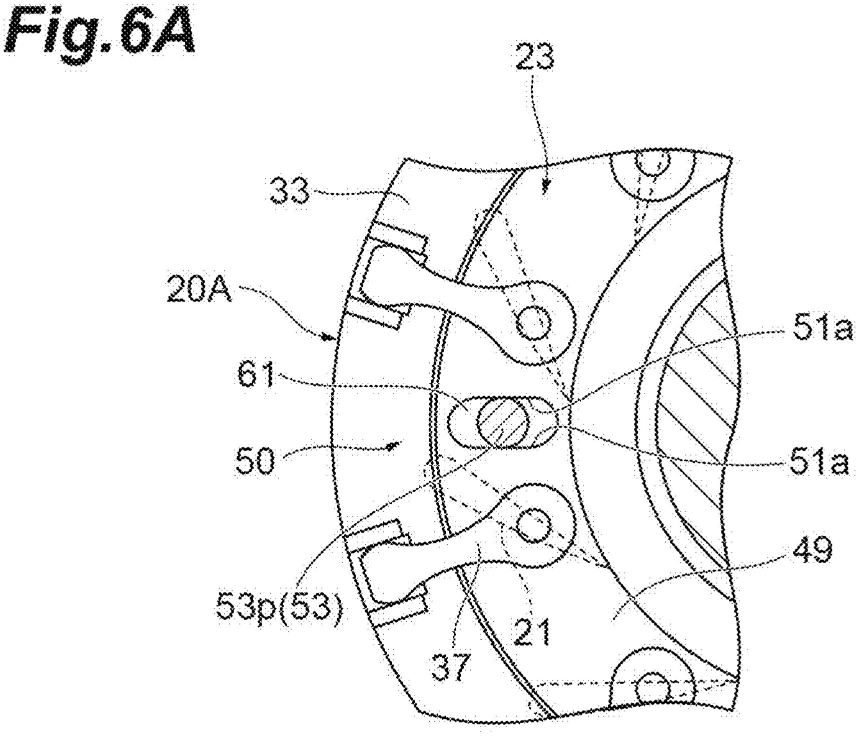
FIG. 6A is an enlarged view illustrating an area at and around the engagement part of an example nozzle ring.

In an example variable nozzle unit 20A illustrated in FIG. 6A, the ring-shaped protrusion 49 of the nozzle ring 23 may be provided with an oblong hole 61 into which the distal end 53*p* of the pin 53 is press-fitted, instead of the U-notch 51. The oblong hole 61 extends in the radial direction Dr, and has a pair of inner wall faces 51*a*, 51*a* similar to those of the U-notch 51.

Figure 6B:
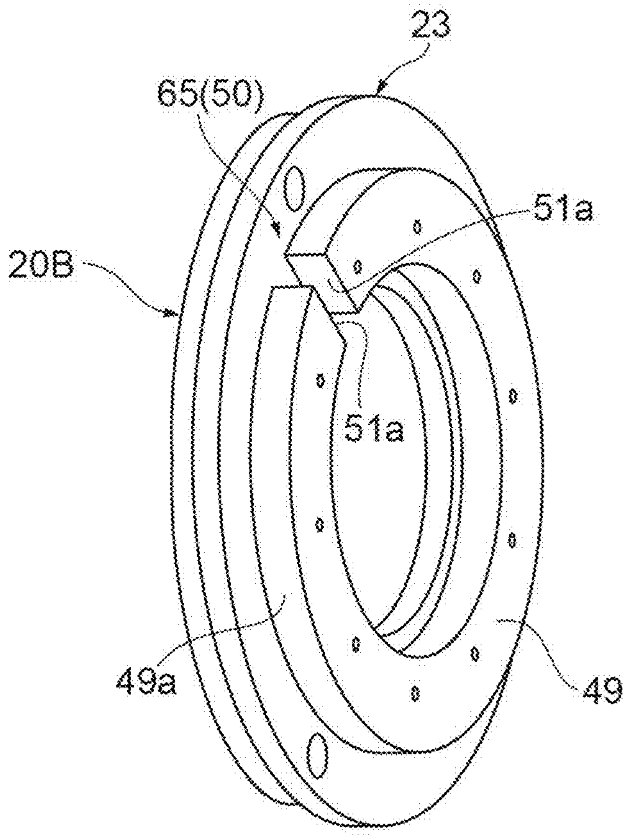
FIG. 6B is a perspective view illustrating an example nozzle ring.

In an example variable nozzle unit 20B illustrated in FIG. 6B, the ring-shaped protrusion 49 of the nozzle ring 23 may be provided with a slit 65 into which the distal end 53*p* of the pin 53 is press-fitted, instead of the U-notch 51. The slit 65 extends over the entire width of the ring-shaped protrusion 49 in the radial direction Dr, and has a pair of inner wall faces 51*a*, 51*a* similar to those of the U-notch 51.

Some additional examples are disclosed as follows, with continued reference to the drawings for convenience of description.

An example variable capacity turbocharger (1) includes a turbine impeller (6), a turbine housing (4) accommodating the turbine impeller (6), a nozzle flow passage (19) located around the turbine impeller (6), a variable nozzle assembly (20) having a nozzle vane (21) located in the nozzle flow passage (19), and a drive mechanism (25) configured to drive the nozzle vane (21), a bearing (15) of the turbine impeller (6), a bearing housing (13) accommodating the bearing (15), a biasing part (43) configured to bias the variable nozzle assembly (20) in an axial direction (Ds) of the turbine impeller (6) so as to be pressed against a part of the turbine housing (4), and a pin (53) that extends from the bearing housing (13). The variable nozzle assembly (20) includes a pin insertion part (51), which allows for insertion of a distal end (53*p*) of the pin (53). The distal end (53*p*) of the pin (53) is inserted into the pin insertion part (51) to restrict a rotational position of the variable nozzle assembly (20).

In the variable capacity turbocharger (1), the pin insertion part (51) may have a pair of inner wall faces (51*a*) given as parallel flat planes that intersect a circumferential direction (Dc) of rotation of the turbine impeller (6), and may hold the distal end (53*p*) of the pin (53) in between the inner wall faces in the circumferential direction (Dc) of rotation.

In the variable capacity turbocharger (1), the distal end (53*p*) of the pin (53) may be press-fitted between the inner wall faces (51*a*).

In the variable capacity turbocharger (1), the pin (53) may have a width, in a direction the inner wall faces are opposed, that is elastically variable.

In the variable capacity turbocharger (1), the pin insertion part (51) may include a notch, an oblong hole or a slit that extends in a transverse direction intersecting the circumferential direction (Dc) of rotation.

In the variable capacity turbocharger (1), the pin (53) may be a coiled pin having an outer diameter that is elastically variable.

In the variable capacity turbocharger (1), the variable nozzle assembly (20) may include a nozzle ring (23) which has a protrusion (49) supporting the nozzle vane (21). The drive mechanism (25) may include a drive ring (33) which surrounds the protrusion (49) and is configured to rotate the nozzle vane (21).

In the variable capacity turbocharger (1), the pin insertion part (51) may be formed in the protrusion (49).

In the variable capacity turbocharger (1), the pin insertion part (51) may extend in a radial direction (Dr) of the turbine impeller (6).

Additionally, an example variable capacity turbocharger (1) includes a turbine impeller (6), a turbine housing (4) accommodating the turbine impeller (6), a nozzle flow passage (19) located around the turbine impeller (6), a bearing (15) for the turbine impeller (6), a bearing housing (13) accommodating the bearing (15), and a variable nozzle assembly (20) located between the turbine housing (4) and the bearing housing (13). The variable nozzle assembly (20) includes a nozzle vane (21) located in the nozzle flow passage (19) and a pin receptor (51). The bearing housing (13) includes a pin (53) that extends in a direction of a rotation axis (H) of the turbine impeller (6). The pin (53) is configured to be inserted into the pin receptor (51) to restrict a rotational position of the variable nozzle assembly (20).

The variable capacity turbocharger (1) may include a biasing part (43) configured to bias the variable nozzle assembly (20) in the direction of the rotation axis (H) of the turbine impeller (6) so as to be pressed against a part of the turbine housing (4).

In the variable capacity turbocharger (1), the pin (53) may be press-fitted in the pin receptor (51).

In the variable capacity turbocharger (1), the pin receptor (51) extends in a radial direction of the turbine impeller (6).

In the variable capacity turbocharger (1), the variable nozzle assembly (20) may include a nozzle ring (23) including a protrusion (49), which supports the nozzle vane (21) and a drive ring (33) surrounding the protrusion (49), and being configured to rotate the nozzle vane (21).

In the variable capacity turbocharger (1), the protrusion (49) may include the pin receptor (51).

In the variable capacity turbocharger (1), the pin receptor (51) includes a pair of inner wall faces (51*a*) which are located in a circumferential direction of the turbine impeller (6). The pin (51) may contact the pair of inner wall faces (51*a*).

The variable capacity turbocharger (1) may include a scroll flow passage (16) located around the turbine impeller (6). The nozzle flow passage (19) may fluidly couple the scroll flow passage (16) and the turbine impeller (6). The variable nozzle assembly (20) may include a nozzle ring (23) supporting the nozzle vane (21).

In the variable capacity turbocharger (1), the pin receptor (51) may include a notch, an oblong hole or a slit that extends in a radial direction of the turbine impeller (6).

In the variable capacity turbocharger (1), the pin receptor (51) may include a first inner wall faces (51*a*) contacting with the pin (53), and a second inner wall faces (51*a*) located opposite to the first inner wall faces (51*a*) in a circumferential direction of the turbine impeller (6). The pin (51) may be located between the first inner wall faces (51*a*) and the second inner wall faces (51*a*).

In the variable capacity turbocharger (1), the pin (53) may be press-fitted between the first inner wall faces (51*a*) and the second inner wall faces (51*a*).

What is claimed is:

1. A variable capacity turbocharger comprising:
- a turbine impeller;
- a turbine housing accommodating the turbine impeller;
- a nozzle flow passage located around the turbine impeller;
- a variable nozzle assembly having a nozzle vane located in the nozzle flow passage, and a drive mechanism configured to drive the nozzle vane;
- a bearing of the turbine impeller;
- a bearing housing accommodating the bearing;
- a biasing part configured to bias the variable nozzle assembly in an axial direction of the turbine impeller so as to press the variable nozzle assembly against a part of the turbine housing; and
- a pin that extends from the bearing housing,
- wherein the variable nozzle assembly includes an opening which allows for insertion of a distal end of the pin, the opening extending along a radial direction of the turbine impeller,
- wherein the distal end of the pin is inserted into the opening so as to be movable in the radial direction of the turbine impeller within the opening to restrict a rotational position of the variable nozzle assembly, and
- wherein at least a portion of the pin is configured to be elastically deformable in a width direction of the opening.

2. The variable capacity turbocharger according to claim 1, wherein the opening has a pair of inner walls extending substantially parallel to each other along the radial direction of the turbine impeller, and wherein the distal end of the pin is sandwiched between the pair of inner walls in the width direction of the opening.

3. The variable capacity turbocharger according to claim 1, wherein the opening comprises a notch, an oblong hole, or a slit that extends in the radial direction of the turbine impeller.

4. The variable capacity turbocharger according to claim 1, wherein the pin is a coiled pin formed by multiple windings of a thin plate.

5. The variable capacity turbocharger according to claim 1, wherein the variable nozzle assembly includes a nozzle ring which has a protrusion supporting the nozzle vane, and wherein the drive mechanism includes a drive ring which surrounds the protrusion and is configured to rotate the nozzle vane.

6. The variable capacity turbocharger according to claim 5, wherein the opening is formed in the protrusion.

7. A variable capacity turbocharger comprising:

a turbine impeller;

a turbine housing accommodating the turbine impeller;

a nozzle flow passage located around the turbine impeller;

a bearing for the turbine impeller;

a bearing housing accommodating the bearing; and a variable nozzle assembly located between the turbine housing and the bearing housing, the variable nozzle assembly including:

a nozzle vane located in the nozzle flow passage; and a pin receptor extending along a radial direction of the turbine impeller, wherein the bearing housing includes a pin that extends in a direction of a rotation axis of the turbine impeller, wherein the pin includes an insertion portion inserted into the pin receptor so as to be movable in the radial direction of the turbine impeller within the pin receptor to restrict a rotational position of the variable nozzle assembly, and wherein the insertion portion of the pin is configured to be elastically deformable in a width direction of the pin receptor.

8. The variable capacity turbocharger according to claim 7, further comprising a biasing part configured to bias the variable nozzle assembly in the direction of the rotation axis of the turbine impeller so as to press the variable nozzle assembly against a part of the turbine housing.

9. The variable capacity turbocharger according to claim 7, wherein the variable nozzle assembly includes:

a nozzle ring including a protrusion, which supports the nozzle vane; and a drive ring surrounding the protrusion, and being configured to rotate the nozzle vane.

10. The variable capacity turbocharger according to claim 9, wherein the protrusion includes the pin receptor.

11. The variable capacity turbocharger according to claim 7, wherein the pin receptor includes a pair of inner walls extending substantially parallel to each other along the radial direction of the turbine impeller, and wherein the pin contacts the pair of inner walls in the width direction of the pin receptor.

12. The variable capacity turbocharger according to claim 7, further comprising a scroll flow passage located around the turbine impeller, wherein the nozzle flow passage fluidly couples the scroll flow passage and the turbine impeller, and wherein the variable nozzle assembly includes a nozzle ring supporting the nozzle vane.

13. The variable capacity turbocharger according to claim 7, wherein the pin receptor includes a notch, an oblong hole, or a slit that extends in the radial direction of the turbine impeller.

14. The variable capacity turbocharger according to claim 7, wherein the pin receptor includes:

a first inner wall extending along the radial direction of the turbine impeller; and a second inner wall extending along the radial direction of the turbine impeller, the second inner wall located opposite to the first inner wall in a circumferential direction of the turbine impeller, and wherein the pin is located between the first inner wall and the second inner wall.

15. The variable capacity turbocharger according to claim 1, wherein the pin is a spring pin having a C-shaped cross section formed by a cutout in a portion of a cylinder.

16. The variable capacity turbocharger according to claim 1, wherein an end surface of the distal end of the pin is spaced apart from the variable nozzle assembly.

17. The variable capacity turbocharger according to claim 16, wherein the opening is configured as a recessed groove, and wherein the end surface of the distal end of the pin is spaced apart from a bottom surface of the recessed groove.

18. The variable capacity turbocharger according to claim 7, wherein the insertion portion of the pin is formed by multiple windings of a thin plate.

19. The variable capacity turbocharger according to claim 7, wherein the insertion portion of the pin has a C-shaped cross section formed by a cutout portion of a cylinder.

20. The variable capacity turbocharger according to claim 7, wherein an end surface of the insertion portion of the pin is spaced apart from the variable nozzle assembly.

* * * * *